Oct. 28, 1952     J. L. CHRISTMANN     2,615,341
GEAR TRANSMISSION SYSTEM
Filed May 24, 1950     2 SHEETS—SHEET 1
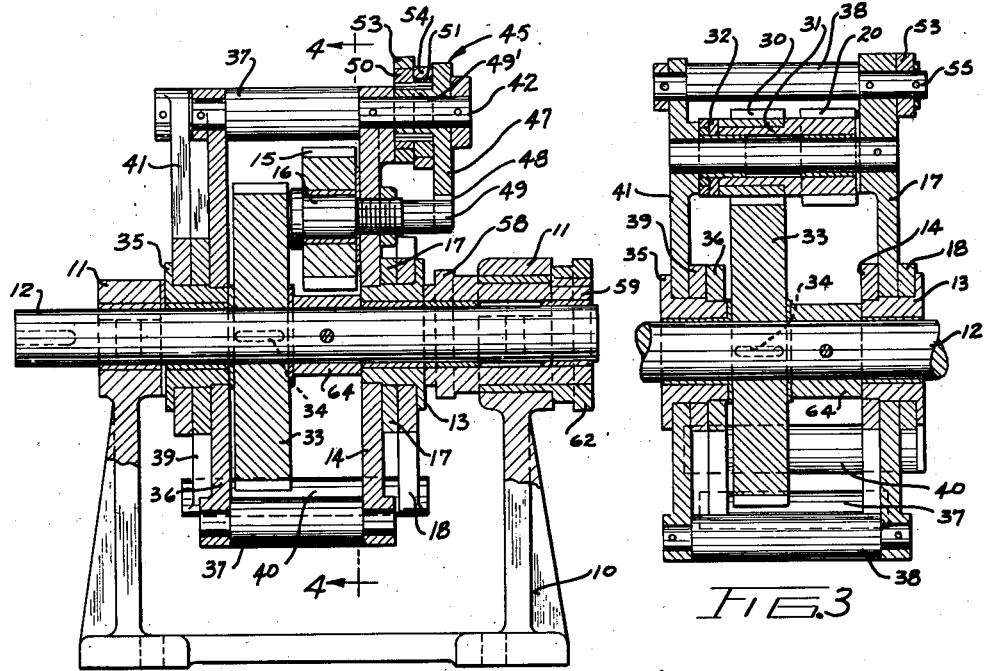
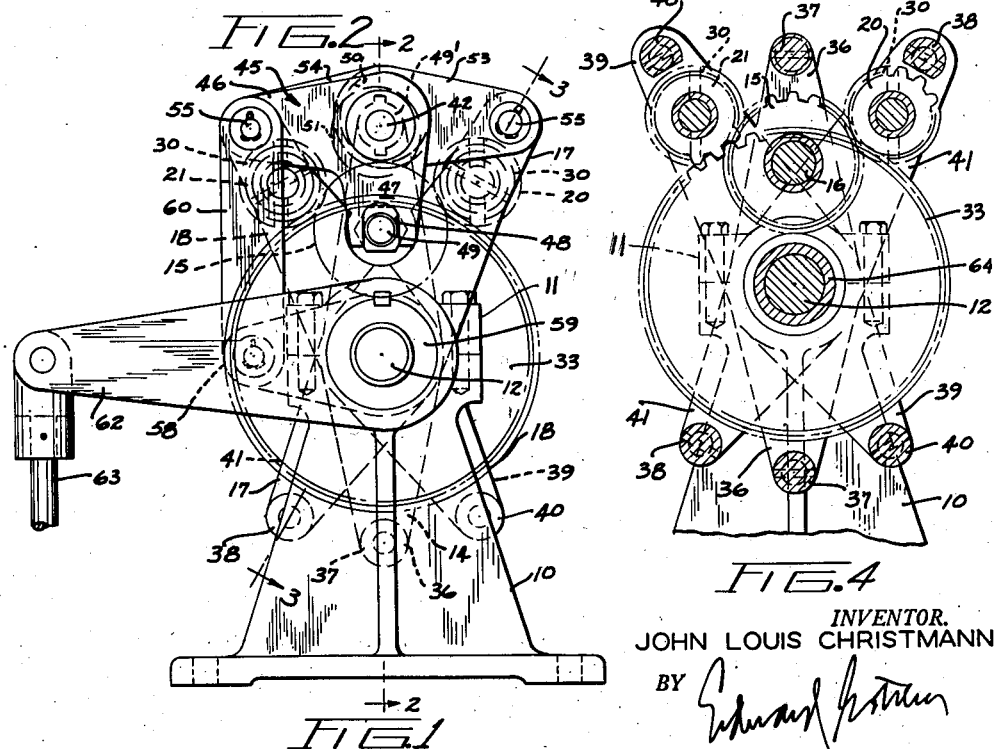
INVENTOR.
JOHN LOUIS CHRISTMANN
BY
ATTORNEY Oct. 28, 1952     J. L. CHRISTMANN     2,615,341
GEAR TRANSMISSION SYSTEM
Filed May 24, 1950     2 SHEETS—SHEET 2
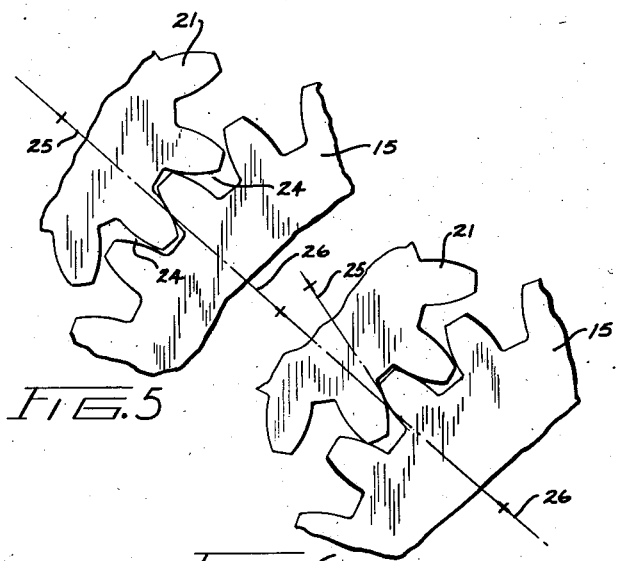
FIG.5
FIG.6
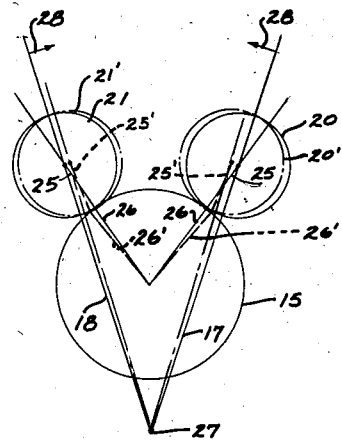
FIG.7
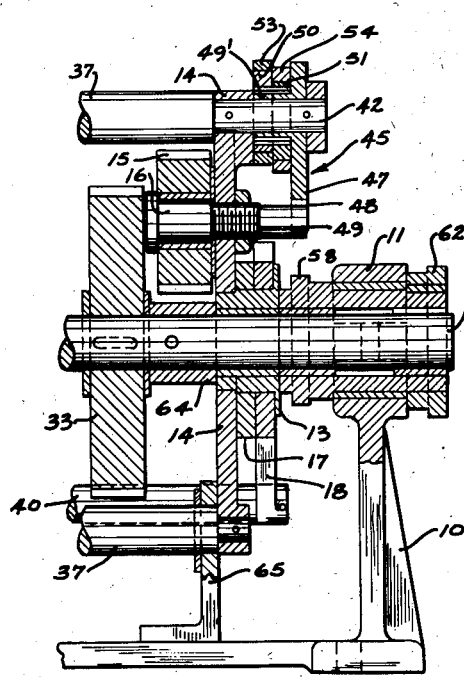
FIG.8
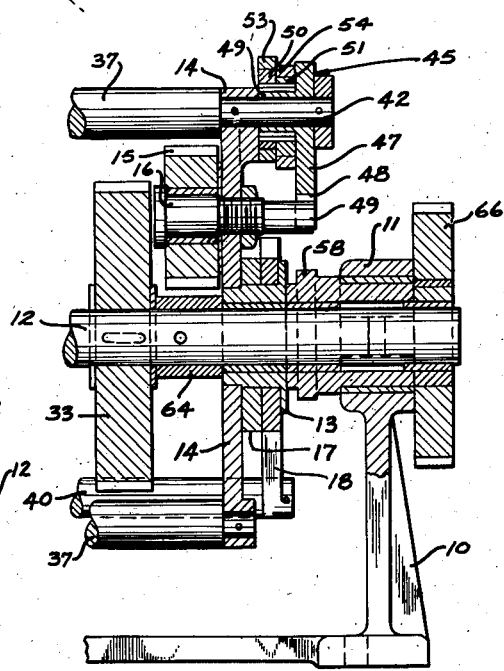
FIG.9
*INVENTOR.*
JOHN LOUIS CHRISTMANN
BY
ATTORNEY Patented Oct. 28, 1952

2,615,341

UNITED STATES PATENT OFFICE 2,615,341

GEAR TRANSMISSION SYSTEM

John Louis Christmann, Passaic, N. J.

Application May 24, 1950, Serial No. 163,949

9 Claims. (Cl. 74—126)

This invention relates to gear transmission systems, and has more particular reference to systems of this type provided with (1) locking actions in one direction of rotation, and (2) locking actions in both directions of rotation. Gear transmission systems of this type are useful in various mechanisms such as ratchet mechanisms, clutch mechanisms, brake mechanisms, variable speed mechanisms, and others.

The new gear transmission system with locking action in one direction is characterized by a pair of meshing gears rotative on centers spaced to provide sufficient back-lash for the gears to freely rotate, and an arm supporting one of said gears and fulcrumed to pivot in a direction, which we shall characterize as forward, so as to reduce the center distance between said gears until the backlash between the teeth of the meshing gears is reduced to zero and said gears pivot on their meshing teeth to a positively locked position against a torque applied to said gears in a direction which assists in moving said fulcrumed arm in said forward direction. It is also proposed to provide means for moving said arm in said forward direction and back again so as to control the locking and releasing of said gear transmission system. The locking action is stepless and independent of the relative angular relationship of said meshing gears.

The new gear transmission system with locking action in both directions is characterized by a rotative gear, a pair of gears meshing with said first named gear and rotative on centers spaced from the center of said first named gear to provide sufficient backlash for all of said gears to freely rotate, and arms supporting said pair of gears and fulcrumed to pivot said pair of gears toward and away from each other, reducing the center distance between said pair of gears and said first named gear upon moving said arms towards each other until the backlash between the meshing teeth is reduced to zero and said pair of gears and said first named gear pivot on their meshing teeth to a positively locked position to torques in either direction. It is also contemplated to provide means for moving said arms towards and away from each other for locking and releasing said gears. The locking action is stepless.

The above features in gear transmission systems as specified represents the broad concept of this invention which may be used in a great many different ways. Some applications of these ways will be given later on in this specification. Before proceeding it may be advisable to point out that the relative sizes of the gears are not important and they may be of the same or different sizes. It is pointed out however that the smaller the number of teeth on the gears of the gear pair supported on the fulcrumed arms, the more effective is the locking action. The manner of mounting the gears is also not important since all gears may be mounted on fulcrumed or other arms, or they need not be so mounted, and the fulcrumed and other arms may or may not have coaxial points of pivoting.

One way of utilizing the broad concepts of this invention would be to provide a double gear attached coaxially to each of said pair of gears and to provide a fourth gear preferably provided with an output shaft, said fourth gear meshing with said double gears and preferably disposed coaxially of the fulcrumed arms of said pair of gears. In one form of gear transmission system said shaft may comprise the output of the system. The input may be provided in numerous ways to give numerous desired actions, such as a ratchet action to the system, a clutch action, a brake action, and other types and kinds of actions.

One way of providing a suitable input makes use of a pair of eccentrics, links connecting said eccentrics with the two arms which control the locking and releasing of the gear transmission system in both directions. It is proposed to provide means for turning said eccentrics to control the locking and releasing of the system. One way for turning the eccentrics would be with the use of a crank arm provided with a hub coaxially supporting said eccentrics, a radial arm pivotally mounted on said shaft, and a link connecting said radial arm with said crank arm, whereby upon motion of the radial arm the eccentrics may be turned in one direction or the other for controlling the locking and releasing of the system.

It is pointed out that the system referred to in the previous paragraph may be operated like a ratchet by reciprocating the radial arm in order that the gears lock during movement of the radial arm in one direction for transmitting intermittent rotation to the output shaft in one direction, and releasing the gears so that the system idles without transmitting rotation in the other direction.

In order that the invention may be better understood three different gear transmission systems have been disclosed in the drawings to illustrate one embodiment of the ratchet action, the clutch action, and the brake action possible in accordance with this invention.

Still further the invention proposes the construction of gear transmission systems of the character referred to in this invention which are simple and durable in construction and which may be manufactured and sold at a reasonable cost.

For further comprehension of the invention, and of the object and advantages thereof, reference will be had to the following description and accompanying drawings, and to the appended claims in which the various novel features of the invention are more particularly set forth.

In the accompanying drawings forming a material part of this disclosure—

Fig. 1 is an end elevational view of a gear transmission system with a ratchet action embodying this invention.

Fig. 2 is a fragmentary vertical sectional view taken on the line 2—2 of Fig. 1.

Fig. 3 is a fragmentary sectional view taken on the line 3—3 of Fig. 1.

Fig. 4 is a fragmentary sectional view taken on the line 4—4 of Fig. 2.

Fig. 5 is a fragmentary enlarged detailed view of one pair of meshing gears used in this transmission and illustrating the usual backlash so that the gears are free to rotate.

Fig. 6 is a fragmentary view similar to Fig. 5 but showing the gears moved relative to each other so that the backlash has been decreased to zero to positively lock the gears.

Fig. 7 is a schematic view of three meshing gears embodied in this transmission and indicating the manner in which the arms supporting two of the gears are moved to move the gears into locking condition.

Fig. 8 is a fragmentary sectional view similar to Fig. 2 but illustrating a gear transmission system with a brake action embodying this invention.

Fig. 9 is another fragmentary view similar to a portion of Fig. 2 but illustrating another gear transmission system with a clutch action in accordance with this invention.

In Figs. 1–7 inclusive, a specific embodiment of the invention has been disclosed for illustrative purposes. In this embodiment the gear transmission system is provided with a ratchet action. This embodiment includes a stationary frame 10 provided with a pair of spaced bearings 11. A shaft 12 is rotatively supported by the bearings 11. A flanged bushing 13 is bushed on the shaft 12 for free rotation. A first arm 14 is fulcrumed on the bushing 13 in order to be fulcrumed on the shaft 12. A gear 15 is rotatively mounted on said first arm 14. More particularly, the gear 15 is bushed upon a stud 16 which is mounted on said first arm 14. A second arm 17 and a third arm 18 are also fulcrumed on the bushing 13 in order to be fulcrumed on the shaft 12. As illustrated in Fig. 1 of the drawing the arms are in a position in which the arm 14 is vertical while the second and third arms 17 and 18, respectively, are inclined forward and rearwards, respectively.

A pair of gears 20 and 21 are rotatively mounted on said second and third arms 17 and 18, respectively, and mesh with said first named gear 15. This pair of gears 20 and 21 have their centers spaced from said first named gear 15 to provide sufficient backlash for all of said gears to rotate freely. This may be better understood by now examining enlarged Fig. 5 in which the gear 21 is illustrated meshing with the gear 15. Particular attention is called to the spaces 24 between the working surfaces of the teeth of the gears, which represents the sufficient backlash for the gears 21 and 15 to rotate freely.

The second and third arms 17 and 18 are capable of pivoting on said bushing 13 towards and away from each other. For example, the top ends of these arms 17 and 18 may pivot towards each other to cause the reduction of the center distances between the gears 20 and 15 and 21 and 15 until the backlash is zero and the gears 20 and 21 pivot on the teeth meshing with gear 15 to positively lock said gears 20, 21 and 15 from turning. This may be better understood by examining Fig. 6 in which the gears 21 and 15 have been moved relative to each other into locking positions. In Fig. 5 the radius 25 of gear 21 is in a straight line with the radius 26 of gear 15 at the point of contact of the meshing teeth on their pitch distances. In Fig. 6 the gears have been illustrated moved so that the radius 25 is now at an angle to the radius 26. This shifting of the gears 21 and 15 relative to each other until their center distances have decreased to reduce the backlash to zero, causes the pivoting of the gears 21 and 15 on their meshing teeth as shown in Fig. 6. The lines 25 and 26 illustrate the toggle effect which locks the gears 21 and 15.

Fig. 7 is a schematic illustration to simplify the relative positions of the gears 20, 21 and 15 in their locking and in their free positions. In this schematic view the gears 20, 21 and 15 have been illustrated in their free running positions by full line circles. The straight lines 17 and 18 represent the arms 17 and 18 which support the gears 20 and 21, respectively. The pivot point 27 of the arms 17 and 18 represent the axis of the shaft 12. When the arms 17 and 18 are moved towards each other, as indicated by the arrows 28, the gears 20 and 21 will be moved towards each other to the positions indicated by the dotted lines 20′ and 21′. In these latter positions the radii of the gears 20 and 15, and 21 and 15 will be at angular positions, as clearly illustrated by the dotted lines 25′ and 26′. The full line positions of the radii of the gears 20, 21 and 15 are indicated by the reference numerals 26 and 26, respectively. It is pointed out that the gears 20, 21 and 15 would also lock if the arms 17 and 18 were moved apart instead of together, provided the fulcrums of the arms 17 and 18 were disposed above the center of gear 15 so that the gears 20 and 21 are moved towards gear 15.

A somewhat clearer understanding of the locking action may be comprehended by considering, for example, just gears 15 and 21 and the arm 18, reference being had to Fig. 7. At the time of the locking movement two distinct and simultaneous actions take place which contributes to the locking effect. One action is a wedging action between gears 21 and 15 due to the arm 18 pivoting on the point 27 and forcing gear 21 towards gear 15 when the arm 18 moves in the direction 28. The second action is the pivoting action of the gears 21 and 15 around their meshing teeth forming a toggle effect along the radii lines 25′ and 26′. This toggle cannot be straightened out by a torque in a clockwise direction by a gear 15 since the arm 18 cannot stretch and therefore the wedging action between gears 21 and 15 is increased by the torque. An anti-clockwise torque of gear 15 would decrease the wedging action and cause straightening of said toggle so then we do not get a positive locking action in this direction.

Up to this point the invention has been described in its broadest concept. In other words, we can now produce a gear transmission system which may be locked in one direction of rotation, and a second gear transmission system which may be locked in both directions of rotation. It is also important to note the locking positions will work irrespective of the relative size of the gears, and irrespective of the manner in which the gears are mounted, limited only by the requirement that they be capable of being moved into and out of locking positions. There are any number of ways in which this broad concept of the invention may be utilized, reference being made to using various inputs and outputs to the locking arrangement.

The particular input and output of that form of the invention shown in Figs. 1–7 inclusive will now be considered in detail. A double gear 30 is coaxially attached to each of said pair of gears 20 and 21. This is accomplished by providing each of the gears 20 and 21 with hubs 31 and mounting the double gears 30 upon these hubs 31. The hubs of the gears 30 and 31 are secured together with pins 32. A fourth gear 33 is mounted on the shaft 12 and meshes with said double gears 30. In the particular design shown, this fourth gear 33 is secured to the shaft 12 with a key 34. The arms 14, 17 and 18 are reinforced with complementary arms and spacer. This construction includes a bushing 35 bushed on the shaft 12. An arm 36 is pivotally mounted on the bushing 35 and is complementary to the first arm 14 and connected to the first arm by spacers 37. An arm 39 is fulcrumed on the bushing 35 and is complementary to the third arm 18 and is rigidly connected therewith by spacers 40. Another arm 41 is complementary to the second arm 17 and is rigidly connected therewith by spacers 38.

A crank arm 45 is pivotally mounted on said first arm 14 by pivotally engaging on an extension 42 of the top spacer 37. This crank arm 45 has a horizontal section 46 and a downwardly extending vertical section 47. The section 47 is provided with a slot 48 which engages over an extension 49 of the stud 16 so as to limit the pivoting of the crank arm 45. The crank arm 45 is provided with a hub 49' upon which a pair of eccentrics 50 and 51 are keyed. These eccentrics are substantially 180° from each other. Links 53 and 54 are pivotally mounted upon the eccentrics 50 and 51 respectively, and pivotally connect with the arms 17 and 18, respectively. The top spacers 38 and 40 of the arms 17 and 18 are provided with extensions 55 upon which the links 53 and 54 are pivotally mounted.

A radial arm 58 is bushed on the shaft 12 and is provided with a hub 59 which extends through one of the bearings 11 of the stationary frame 10. A link 60 is pivotally mounted upon the outer end of the section 46 of the crank arm 45 and pivotally connects with the outer end of the radial arm 58. A radial arm 62 is keyed upon the outer end of the hub 59 and connects with an arm 63 which may be reciprocated by some mechanism, not shown. A collar 64 is pinned to the shaft 12 between the gear 33 and the bushing 13 to prevent the gear 33 from shifting on the shaft 12.

The operation of this gear transmission system with ratchet action may be understood from the following:

The rod 63 may be reciprocated upwards and downwards any desired amount to transmit an intermittent forward rotation to the output shaft 12. For example, when the rod 63 moves upwards the radial arm 62 will move correspondingly and move the radial arm 58 which through the links 60 pivots the crank arm 45 clockwise against the stop extension 49. Since the eccentrics 50 and 51 are mounted on the hub of the crank arm 45 they will correspondingly turn and move the links 53 and 54 apart as limited by the slot 48 striking the extension 49 of the stud 16. When the links 53 and 54 are moved apart they correspondingly pivot the arms 17 and 18 apart into positions in which the gears 20 and 21 are free to rotate with the gear 15. Because the gears 20, 21 and 15 are free to rotate the rod 63 may be moved upwards any amount correspondingly pivoting the frames formed by the arms 14, 36 and 17, 41 and 18, 39, and the double gears 30 will merely idle around the gear 33. When the rod 63 moves downward the gears will lock before the slotted extension of crank 45 touches the pin 49. The eccentrics 50 and 51 are adjusted so that the pin 49 will allow just the correct amount of backlash for the gears when they are free, the locking action forms its own limit stop on the locking part of the stroke. In this second position the eccentrics 50 and 51 move the links 53 and 54 together causing the backlash between the gears to decrease to zero and the gears to pivot on their meshing teeth to a positively locked condition in either direction. Since the gears 20 and 21 are now locked, the double gears 30 will rotate the gear 33 a distance corresponding with the downward motion of the rod 63 which is communicated to said frames. Consequently, the shaft 12 will be driven forwards intermittently as the rod 63 reciprocates. This corresponds to a ratchet action.

In Fig. 8 a modified form of gear transmission system has been disclosed which includes a brake action. The brake action may be obtained by anchoring one of the arms which are fulcrumed on the shaft 12, and for illustrative purposes arm 14 has been anchored. A bracket 65 has been mounted upon the frame 10 about the spacer 37 so as to anchor the arm 14 in a stationary position. In other respects this form of the invention is identical to the previous form and like parts have been indicated by like reference numerals. This modified device may now act as a brake system. When the radial arm 62 is in a raised position so that the gears are free to rotate, the gear 15 may be driven in either direction by mechanism, not illustrated on the drawing, through the gear 33 and the shaft 12. The brake is applied by merely moving the radial arm 62 downwards so that the crank arm 45 is pivoted to its second position in which the gears lock, as already described. This locking of the gears against rotation in either direction applies the brake to the system when driven in either direction. It is obvious that if the gear transmission system were modified to eliminate one of the gears 20 or 21 then the brake will operate when the gear system is driven in one direction only. When the two gears 20 and 21 are used then the brake will operate with the gear transmission system driven in either direction.

In Fig. 9 another modified form of the invention has been disclosed which has been modified to act as a clutch. In this form of the invention a gear 66 is substituted for the radial arm 62. In other respects this form of the invention is identical to the previous forms and like parts are identified by like reference numerals.

The operation of this form of the invention is as follows:

When the gear 66 is driven in one direction a torque will be transmitted to the radial arm 58 through the link 60, to the crank arm 45 so as to pivot the crank arm 45 to cause the links 53 and 54 to separate and move the system into a position in which the gears are unlocked. Now the clutch is open because no rotations will be transmitted from the gear 66 to the gear 33. When the gear 66 is driven in the other direction the radial arm 58 will be moved downwards and indirectly pivot the crank arm 45 so as to draw the links 53 and 54 together, moving the gears of the system into locking condition. When the gears are locked rotations will be transmitted from gear 66 to the gear 33 which now corresponds with the closed condition of the clutch.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In a gear transmission system, a stationary frame, a shaft rotatively mounted on said frame, a first arm fulcrumed on said shaft, a gear rotative on said first arm, a second and third arm fulcrumed on said shaft, a pair of gears rotative on said second and third arms and meshing with said first named gear and having their centers spaced from the center of said first named gear to provide sufficient backlash for all of said gears to freely rotate, and means for pivoting said second and third arms toward each other to move said pair of gears towards each other and lock them together against rotation.

2. In a gear transmission system, a stationary frame, a shaft rotatively mounted on said frame, a first arm fulcrumed on said shaft, a gear rotative on said first arm, a second and third arm fulcrumed on said shaft, a pair of gears rotative on said second and third arms and meshing with said first named gear and having their centers spaced from the center of said first named gear to provide sufficient backlash for all of said gears to freely rotate, means for pivoting said second and third arms towards each other to move said pair of gears towards each other and lock them against rotation, a double gear attached to each of said pair of gears, and a fourth gear mounted on said shaft and meshing with said double gears, whereby when said pair of gears are locked said arms may be turned on said shaft to cause said pair of locked gears to turn said fourth gear.

3. In a gear transmission system, a stationary frame, a shaft rotatively mounted on said frame, a first arm fulcrumed on said shaft, a gear rotative on said first arm, a second and third arm fulcrumed on said shaft, a pair of gears rotative on said second and third arms and meshing with said first named gear and having their centers spaced from the center of said first named gear to provide sufficient backlash for all of said gears to freely rotate, and said second and third arms being capable of pivoting towards each other to move said pair of gears towards each other, a double gear attached to each of said pair of gears, a fourth gear mounted on said shaft and meshing with said double gears, a crank arm pivotally mounted on said first arm, a pair of eccentrics substantially 180° from each other and coaxially mounted on said crank arm, links connecting said eccentrics with said second and third arms, a radial arm pivotally mounted on said shaft, and a link connecting said radial arm with said crank arm, whereby said radial arm may be moved in one direction to lock said gears and in the other to free said gears.

4. A gear transmission system as defined in claim 3, in which said crank arm is provided with a slot, and a stop is mounted on said first arm and engages said slot for limiting the motion of said eccentrics.

5. A gear transmission system as defined in claim 3, in which a double radial arm is connected with said radial arm for the operation of the latter arm.

6. A gear transmission system as defined in claim 3, in which a gear is rotatively mounted on said shaft and is fixedly connected with said radial arm by which said fourth gear may be driven in either direction to positively drive the shaft in that direction.

7. A gear transmission system as defined in claim 3, in which means is provided for holding said first arm in a stationary position.

8. A gear transmission system as defined in claim 3, in which means is provided for holding one of said first, second and third arms in a stationary position.

9. A gear transmission system as defined in claim 1, in which arms complementary to said first, second and third arms are fulcrumed on said shaft and rigidly connected respectively with said first, second, and third arms with spacers.

JOHN LOUIS CHRISTMANN.

REFERENCES CITED

The following references are of record in the file of this patent:

UNITED STATES PATENTS

| Number | Name | Date |
|---|---|---|
| 846,182 | Boughton | Mar. 5, 1907 |
| 2,382,846 | Barber | Aug. 14, 1945 |

FOREIGN PATENTS

| Number | Country | Date |
|---|---|---|
| 237,761 | Great Britain | Aug. 6, 1925 |
| 550,667 | Great Britain | Jan. 19, 1943 |